United States Patent [19]
Osborne

[11] 4,137,847
[45] Feb. 6, 1979

[54] GAS GENERATOR

[75] Inventor: Turner E. Osborne, Bellbrook, Ohio

[73] Assignee: General Motors Corporation, Detroit, Mich.

[21] Appl. No.: 845,880

[22] Filed: Oct. 27, 1977

[51] Int. Cl.² .............................................. F42B 3/04
[52] U.S. Cl. ..................................... 102/39; 280/741
[58] Field of Search .................. 102/39; 280/736, 740, 280/741, 742

[56] References Cited

U.S. PATENT DOCUMENTS

| 3,647,393 | 3/1972 | Leising et al. | 280/376 |
| 3,733,180 | 5/1973 | Heineck et al. | 280/741 |
| 3,985,076 | 10/1976 | Schneiter et al. | 102/39 |
| 4,013,010 | 3/1977 | Schneiter et al. | 280/740 |

FOREIGN PATENT DOCUMENTS 2330194  12/1974  Fed. Rep. of Germany ........... 280/740

Primary Examiner—Harold J. Tudor
Attorney, Agent, or Firm—Herbert Furman

[57] ABSTRACT

A gas generator includes an annular hermetically sealed combustion chamber containing a charge of propellant and an initiator. The combustion chamber is enclosed within a circular inner housing having peripherally spaced groups of openings. Disposed radially of each group of openings is a roll of filter screen wrapped about a central neutralizer core. An outer housing includes two members, each member having three spaced circular embossments. The embossments open to each other and define circular enclosures when the housing members are abutted. One enclosure encapsulates the combustion chamber and inner housing. The other enclosures encapsulate respective rolls of filter screen. The embossments of the housing members are interconnected by grooves which open to each other and define passages connecting the enclosures when the members are abutted. Additional grooves in the members define passages connecting the screen enclosures with an article to be inflated.

3 Claims, 2 Drawing Figures

GAS GENERATOR

This invention relates to gas generators and more particularly to solid propellant gas generators for generating gas to inflate an inflatable article, such as an inflatable occupant restraint cushion.

One of the features of this invention is that a hermetically sealed combustion chamber includes an annular wall which is rupturable under pressure through peripherally spaced groups of openings in an annular inner housing to permit the gas from the combustion chamber to flow through passages to rolls of screen material which are spaced radially of the combustion chamber. It is known in the prior art to provide a hermetically sealed combustion chamber which is provided with an annular wall rupturable through an outer annular housing. However, in such prior art generators, the filtering and cooling screen material is either located inside the annular wall of the combustion chamber or wrapped around such wall or the annular housing enclosing such wall. By separating the filtering and cooling screens from the combustion chamber and housing, this invention permits the overall diameter of the gas generator to be reduced while permitting increased filtering and cooling screen area.

Another feature is that the rolls of filter screen, the combustion chamber and the inner housing are encapsulated in respective enclosures of an outer housing which also includes passages communicating the enclosures with each other and communicating the enclosures for the rolls of screen material with an article to be inflated. A further feature is that the rolls of filter screen are wrapped about a central core of neutralizer. Yet another feature is that the outer housing is comprised of two flanged members, each having spaced embossments which open to each other to provide the encapsulating enclosures when the members are flange abutted. Yet a further feature is that the passages within the outer housing are provided by grooves opening to each other when the members are flange abutted.

These and other features of the generator of this invention will be readily apparent from the following specification and drawing wherein.

Figure 1:
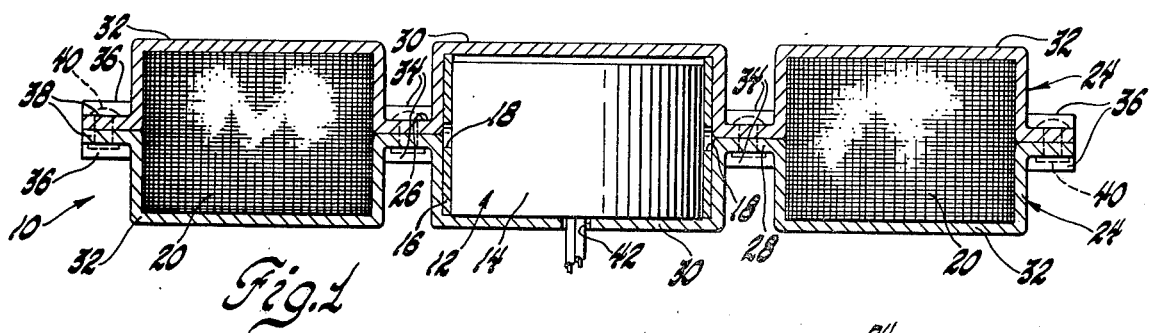
FIG. 1 is a sectional view of a gas generator according to this invention.
Figure 2:
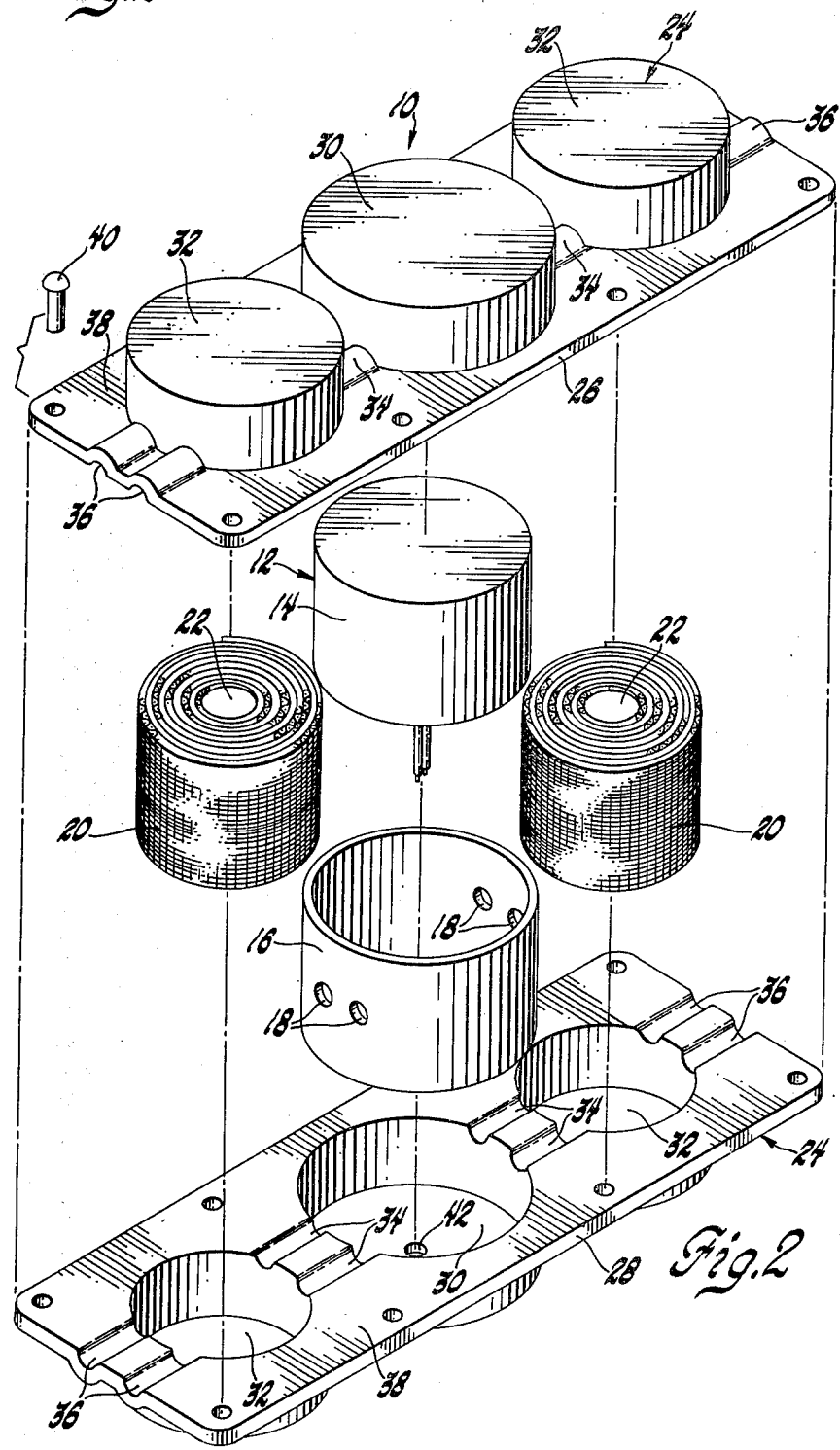
FIG. 2 is an exploded perspective view.

Referring now to the drawing, a gas generator 10 according to this invention includes an annular sealed combustion chamber 12. The details of the combustion chamber 12 are not disclosed herein since reference may be made to copending application Ser. No. 830,117 filed Sept. 2, 1977, Sidney G. Dunford, assigned to the assignee of the present invention, for a full and complete disclosure of such a combustion chamber. For an understanding of this invention, all that is necessary to disclose is that the combustion chamber 12 includes an outer cylindrical or annular rupturable wall 14.

A cylindrical inner housing 16 surrounds the wall 14 of the combustion chamber 12. The housing 16 includes diametrically opposite groups of openings 18. Although each group is shown to include two openings 18, it will be understood that more openings may be provided, if desired, or that only one opening may be used, if desired. When the pressure within the combustion chamber attains a predetermined minimum level, wall 14 will rupture outwardly through each group of openings 18 to provide for exit of the gas generated within the combustion chamber 12.

A wrapped roll 20 of screen material is located radially opposite each of the groups of openings 18. In the specific embodiment shown, each roll 20 is comprised of a multiplicity of wrapped layers of fine mesh screen such as 30 to 40 mesh. Each roll is wrapped about a central or axial core 22 of suitable neutralizer material.

An outer housing 24 is comprised of two symmetrical flanged members 26 and 28. Each member includes three spaced integral embossments, a central or main embossment 30 and a pair of like satellite embossments 32 which are spaced radially of embossment 30. Each housing member also includes like pairs of spaced grooves 34 which communicate the main embossment 30 with each satellite embossment 32, and like pairs of grooves 36 which communicate each embossment 32 outwardly of the housing 24. The grooves 34 and 36 are integrally formed in an integral flange 38 of each housing member.

When the members 26 and 28 are flange abutted, the oppositely opening pairs of embossments 30 provide an encapsulating main enclosure for housing 16 and combustion chamber 12. Likewise, the oppositely opening pairs of embossments 32 provide encapsulating satellite enclosures for the wrapped rolls 20 of screen material. The grooves 34 cooperatively define passages communicating the main enclosure with each satellite enclosure, and the grooves 36 cooperatively define passages communicating the satellite enclosures with an article to be inflated. The outer housing members may be secured to each other in any conventional manner, such as by rivets 40 which extend through aligned openings in the flanges 38 when the housing members are flange abutted. If desired, any suitable sealing arrangement may be provided between the abutting flanges 38 to ensure a gas tight enclosure for the gases and permit no exit of the gases other than through the passages defined by grooves 36.

The main embossment 30 of housing member 28 is provided with an opening 42 to provide for electrical communication from a source of power and a suitable sensor to the initiator, not shown, of the combustion chamber 12.

Upon the attainment of a predetermined minimum pressure level within the combustion chamber 12, and the rupture of the portions of the wall 14 opposite the openings 18, the gas will flow radially of the combustion chamber through the passages defined by grooves 34 and generally diametrically of each of the rolls 20 of screen material and through the neutralizer 22 of each such roll. Thereafter the gases will flow outwardly of the gas generator through the passages defined by the grooves 36.

From the foregoing description it can be seen that the gas generator of this invention is of minimum width but has increased filtering and cooling screen area. The satellite embossments 32 are formed such that the rolls 20 of screen material tightly fit within the enclosures defined thereby. Likewise the embossments 30 are formed so that the housing 16 tightly fits within the enclosure defined thereby.

Thus this invention provides an improved gas generator.

The embodiments of the invention in which an exclusive property or privilege is claimed are defined as follows:

1. A gas generator comprising, in combination, an annular combustion chamber, a number of annular cooling and filtering means located in radially spaced relationship to each other and to the annular combustion chamber, an outer housing having a first cup shaped annular portion encapsulating the annular combustion chamber and a number of other spaced annular portions, each respectively encapsulating an annular filtering and cooling means, continuous flange means joining the annular portions of the housing with each other, first flow passage means provided by the continuous flange means interconnecting the first annular portion of the housing with each of the other annular portions thereof, and second flow passage means provided by the continuous flange means interconnecting each of the other annular portions of the housing and an article to be inflated.

2. A gas generator comprising, in combination, an annular combustion chamber, a number of annular cooling and filtering means located in radially spaced relationship to each other and to the annular combustion chamber, an outer two part housing, each part having a first cup shaped annular portion and a number of other cup shaped annular portions interconnected by a continuous flange means, the first annular portions opening to each other and encapsulating the annular combustion chamber and the other annular portions opening to each other and respectively encapsulating an annular filtering and cooling means, each flange means abutting the other and including means cooperatively providing first flow passage means interconnecting the first annular portion of the housing with each of the other annular portions thereof and second flow passage means interconnecting each of the other annular portions of the housing and an article to be inflated.

3. A gas generator comprising, in combination, an annular combustion chamber, a number of annular cooling and filtering means located in radially spaced relationship to each other and to the annular combustion chamber, an outer two part housing, each part having a first cup shaped annular portion and a number of other cup shaped annular portions interconnected by a continuous flange means, the first annular portions opening to each other and encapsulating the annular combustion chamber and the other annular portions opening to each other and respectively encapsulating an annular filtering and cooling means, each flange means abutting the other and including at least one first groove interconnecting the first annular portion with the other annular portions and at least one second groove interconnecting each other annular portion and the flange terminus, the first grooves opening to each other and the grooves cooperatively providing first flow passage means interconnecting the first annular portions with each of the other annular portions, the second grooves opening to each other and cooperatively providing second flow passage means interconnecting each of the other annular portions and an article to be inflated.

* * * * *